US012665502B2

(12) United States Patent
Huh et al.

(10) Patent No.: US 12,665,502 B2
(45) Date of Patent: Jun. 23, 2026

(54) POWER CONVERTER AND POWER CONVERSION METHOD USING SAME

(71) Applicant: SAMSUNG ELECTRONICS CO., LTD., Suwon-si (KR)

(72) Inventors: Yeunhee Huh, Suwon-si (KR); Tae-Hwang Kong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 18/415,335

(22) Filed: Jan. 17, 2024

(65) Prior Publication Data

US 2025/0023465 A1      Jan. 16, 2025

(30) Foreign Application Priority Data

Jul. 13, 2023    (KR) ........................ 10-2023-0090889

(51) Int. Cl.
*H02M 3/07*        (2006.01)
*H02M 1/00*        (2006.01)

(52) U.S. Cl.
CPC ............. *H02M 3/07* (2013.01); *H02M 1/007* (2021.05); *H02M 1/0095* (2021.05)

(58) Field of Classification Search
CPC ...... H02M 3/07; H02M 1/0095; H02M 1/007; H02M 1/0077; Y02B 70/10
See application file for complete search history.

(56) References Cited

U.S. PATENT DOCUMENTS

| | | | |
|---|---|---|---|
| 9,667,139 B2 | 5/2017 | Giuliano et al. | |
| 10,693,370 B1 | 6/2020 | Krstic | |
| 10,778,098 B2 | 9/2020 | Yang et al. | |
| 11,581,805 B2 | 2/2023 | Szczeszynski | |
| 2021/0313936 A1* | 10/2021 | Garrett ................. | H02M 3/158 |
| 2021/0351695 A1 | 11/2021 | Liu et al. | |
| 2022/0166339 A1 | 5/2022 | Chang et al. | |
| 2022/0231601 A1* | 7/2022 | Jong ................... | H02M 1/0043 |
| 2022/0263410 A1 | 8/2022 | Saggini et al. | |
| 2022/0321001 A1 | 10/2022 | Huang et al. | |

FOREIGN PATENT DOCUMENTS

WO        2022/109416 A1    5/2022

OTHER PUBLICATIONS

Kang Wei et al., "Direct 12V/24V-to-1V Tri-State Double Step-Down Power Converter With Online VCF Rebalancing and In-Situ Precharge Rate Regulation", in IEEE Journal of Solid-State Circuits, vol. 56, No. 8, pp. 2416-2426, Aug. 2021, doi: 10.1109/JSSC.2021.3053457.

(Continued)

*Primary Examiner* — Crystal L Hammond
*Assistant Examiner* — Nicolas Alden Chapa Mills
(74) *Attorney, Agent, or Firm* — Sughrue Mion, PLLC

(57)        ABSTRACT
There is provided a power converter including a first circuit, a second circuit and a controller. The first circuit includes a switched inductor circuit and outputs a current based on a first voltage as an input. The second circuit includes a switched capacitor circuit and an output capacitor and outputs a second voltage lower than the first voltage, based on the current output by the first circuit as an input. The controller controls the second circuit to output the second voltage.

20 Claims, 20 Drawing Sheets

(56)  References Cited

OTHER PUBLICATIONS

Minxiang Gong et al., "A 90.4% Peak Efficiency 48V/1V Three-Level Hybrid Dickson Converter with Gradient Descent Run-Time Optimizer and GaN/Si Hybrid Conversion", 2022 IEEE Symposium on VLSI Technology and Circuits (VLSI Technology and Circuits), 2022, pp. 176-177, doi: 10.1109/VLSITechnologyandCir46769.2022.9830284.

Xu Yang et al., "33.4 An 8A 998A/inch3 90.2% Peak Efficiency 48V-to-1V DC-DC Converter Adopting On-Chip Switch and GaN Hybrid Power Conversion", 2021 IEEE International Solid-State Circuits Conference (ISSCC), 2021, pp. 466-468, doi: 10.1109/ISSCC42613.2021.9366005.

Mark Kane, "Tesla Confirms the Switch to 48 Volt System", Mar. 11, 2023, 3 pages, https://insideevs.com/news/656775/tesla-switch-48v-voltage-system/.

* cited by examiner

POWER CONVERTER AND POWER CONVERSION METHOD USING SAME

CROSS-REFERENCE TO RELATED APPLICATION(S)

This application is based on and claims priority from Korean Patent Application No. 10-2023-0090889, filed on Jul. 13, 2023, in the Korean Intellectual Property Office, the disclosure of which is incorporated by reference herein in its entirety.

BACKGROUND

1. Field

The disclosure relates to a power converter and a power conversion method using the power converter.

2. Description of the Related Art

With an increase in applications using artificial intelligence (AI) computing technology, power required for a processor, a memory, a high-speed interface, and the like for running these applications also increases.

In terms of power conversion, in order to deal with an increase in power at a load terminal, it is also required to increase power at an input terminal. In this case, in order to reduce power loss and voltage drop at the input terminal and to reduce volume and weight at the input terminal, it is effective to increase an input voltage and reduce an input current.

In order to form an efficient power architecture, it is required to increase a voltage at the input terminal, but the load terminal requires a very low voltage level of, for example, 0.7 V to 1 V. A buck converter, which is a dc-dc converter generally used for supplying a lower output voltage than an input voltage, has a problem in that if there is a large voltage difference between input and output, the on-duty of the converter is significantly reduced, resulting in low power efficiency.

Accordingly, there is an urgent need for a dc-dc voltage conversion method capable of achieving high power density and ensuring high efficiency of power conversion even under high voltage conversion ratio conditions.

SUMMARY

According to an aspect of the disclosure, there is provided a power converter including a first circuit comprising a switched inductor circuit, the first circuit configured to output a current based on a first voltage as an input of the first circuit, a second circuit comprising a switched capacitor circuit and an output capacitor, the second circuit configured to output a second voltage lower than the first voltage, based on the current output by the first circuit as an input of the second circuit and a controller configured to control the second circuit to output the second voltage.

The first circuit may include a plurality of switches and one or more inductors.

The first circuit may further include a flying capacitor.

The switched capacitor circuit main include i number of capacitors and 3 times i (3×i) number switches, where i is a positive integer.

The switched capacitor circuit may include a first switch having a first end connected to an input terminal; a second switch having a first end connected to a second end of the first switch and an output terminal; a third switch having a first end connected to a second end of the second switch and a second end grounded; and a capacitor provided between the first end of the first switch and the second end of the second switch.

The second circuit may include two or more switched capacitor circuits connected in series with each other.

The two or more switched capacitor circuits may have a same structure.

At least some of the two or more switched capacitor circuits may have different structures.

The second circuit may include a first switched capacitor circuit having one capacitor and three switches, and a second switched capacitor circuit having two capacitors and six switches, wherein the first switched capacitor circuit and the second switched capacitor circuit are connected in series with each other.

The second circuit may include a first switched capacitor circuit having two capacitors and six switches, a second switched capacitor circuit having three capacitors and nine switches, and a third switched capacitor circuit having two capacitors and six switches, wherein the first switched capacitor circuit, the second switched capacitor circuit and the third switched capacitor circuit are connected in series with each other.

The second circuit may include first elements configured to operate at a lower voltage than second elements of the first circuit.

A first duty is set for the first circuit, and a second duty is set for the second circuit, wherein the first duty is a fixed value.

The controller may be configured to form a feedback loop with the second circuit to adjust the second duty of the second circuit.

The power converter may further include another second circuit connected in parallel with the second circuit, wherein the controller is configured to drive the second circuit and the other second circuit with different phases.

The controller may be configured to drive the second circuit in two or more stages.

The second circuit may further include a first group of switched capacitor circuits and a second group of switched capacitor circuits, and wherein the controller may be configured to control the second circuit, in a first stage to charge capacitors in the first group of switched capacitor circuits and discharge capacitors in the second group of switched capacitor circuits, and control the second circuit, in a second stage, to charge the capacitors in the first group of switched capacitor circuits and discharge the capacitors in the second group of switched capacitor circuits.

The controller may be configured to operate the first stage during a period of time corresponding to a value obtained by multiplying a duty ratio and cycle of the second circuit, and to operate the second stage during a period time corresponding to a value obtained by subtracting the value, obtained by multiplying the duty ratio and cycle of the second circuit, from 1.

According to another aspect of the disclosure, there is provided a power conversion method including outputting a current by using a first voltage as an input into a first circuit including a switched inductor circuit; outputting a second voltage by using the current output by the first circuit as an input into a second circuit including a switched capacitor circuit and an output capacitor, the second voltage being lower than the first voltage; and controlling, by a controller, an operation of the second circuit.

The controlling of the operation of the second circuit may include forming a feedback loop between the controller and the second circuit; and adjusting a duty of the second circuit to control the second voltage.

The controlling of the operation of the second circuit may include charging capacitors in a first group of switched capacitor circuits including in the second circuit and discharging capacitors in a second group of switched capacitor circuits included in the second circuit; and discharging the capacitors in the first group of switched capacitor circuits and charging the capacitors in the second group of switched capacitor circuits.

BRIEF DESCRIPTION OF DRAWINGS

FIG. 2B is a circuit diagram illustrating a power converter according to an embodiment of the disclosure.

FIGS. 5A and 5B are circuit diagrams illustrating a structure of a second circuit according to another embodiment of the disclosure.

FIGS. 6A and 6B are a block diagram and a circuit diagram, respectively, of a power converter including a first circuit and a plurality of second circuits.

FIGS. 8A and 8B are circuit diagrams explaining an example of driving a first circuit.

DETAILED DESCRIPTION

Figure 1:
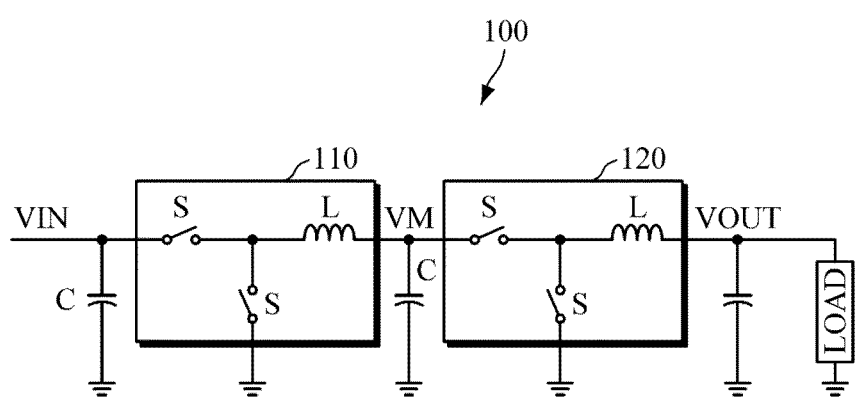
FIG. 1 is a circuit diagram illustrating a two-stage power converter using a related art buck converter.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. Advantages and features of the embodiments of the disclosure, and a method of achieving the same will be more clearly understood from the following embodiments described in detail with reference to the accompanying drawings.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as "unit" or "module," etc., should be understood as a unit that performs at least one function or operation and that may be embodied as hardware, software, or a combination thereof.

As mentioned above, a buck converter may be used as a power converter that supplies a low output voltage compared to an input voltage. However, buck converters tend to have significantly lower efficiency when the power conversion ratio (VIN/VOUT) is high. In order to overcome this problem, a method of converting voltage in two stages is generally used. That is, in order to meet the recent demand for high voltage at the input stage (e.g., 48V system required by electric vehicles or data centers), a method of converting voltage in two stages is generally used.

FIG. 1 is a circuit diagram illustrating a two-stage power converter using a related art buck converter.

Referring to FIG. 1, for example, a power converter 100 may generate an intermediate voltage VM by primarily stepping down an input voltage VIN to about ¼ or ¹⁄₁₀ in a first stage 110, and may generate an output voltage VOUT of about 0.7 V to 1.2 V by secondarily stepping down the intermediate voltage VM to about ¼ or ¹⁄₁₀ again in a second stage 120.

While the two-stage power converter illustrated in FIG. 1 has excellent power efficiency (e.g., 80%) compared to power efficiency (e.g., 70%) of a device using a single buck converter, the power efficiency of the two-stage power converter is still insufficient for a high-power system that is sensitive to power loss occurring due to a small difference in power efficiency.

In addition, a single-stage hybrid converter is also used in which switches and capacitors are arranged on a high-voltage input side which is a front end of an inductor in the power converter. However, the single-stage hybrid converter has a problem in that the single-stage hybrid converter requires high-voltage elements due to internal pressure of the switches and capacitors, resulting in low power density of the power converter.

Figure 2A:
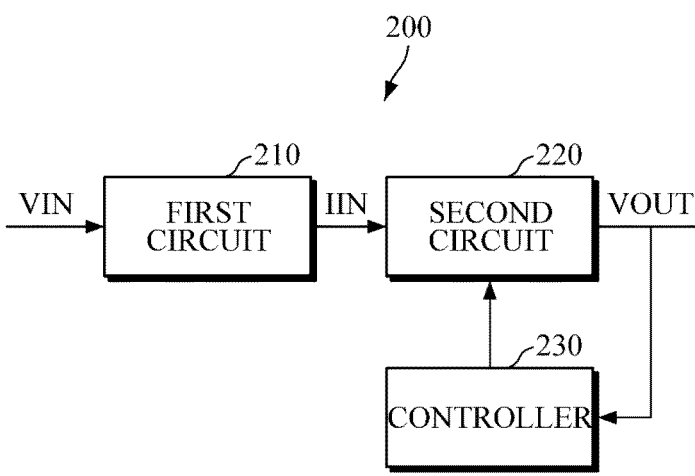
FIG. 2A is a block diagram illustrating a power converter according to an embodiment of the disclosure
Figure 2B:
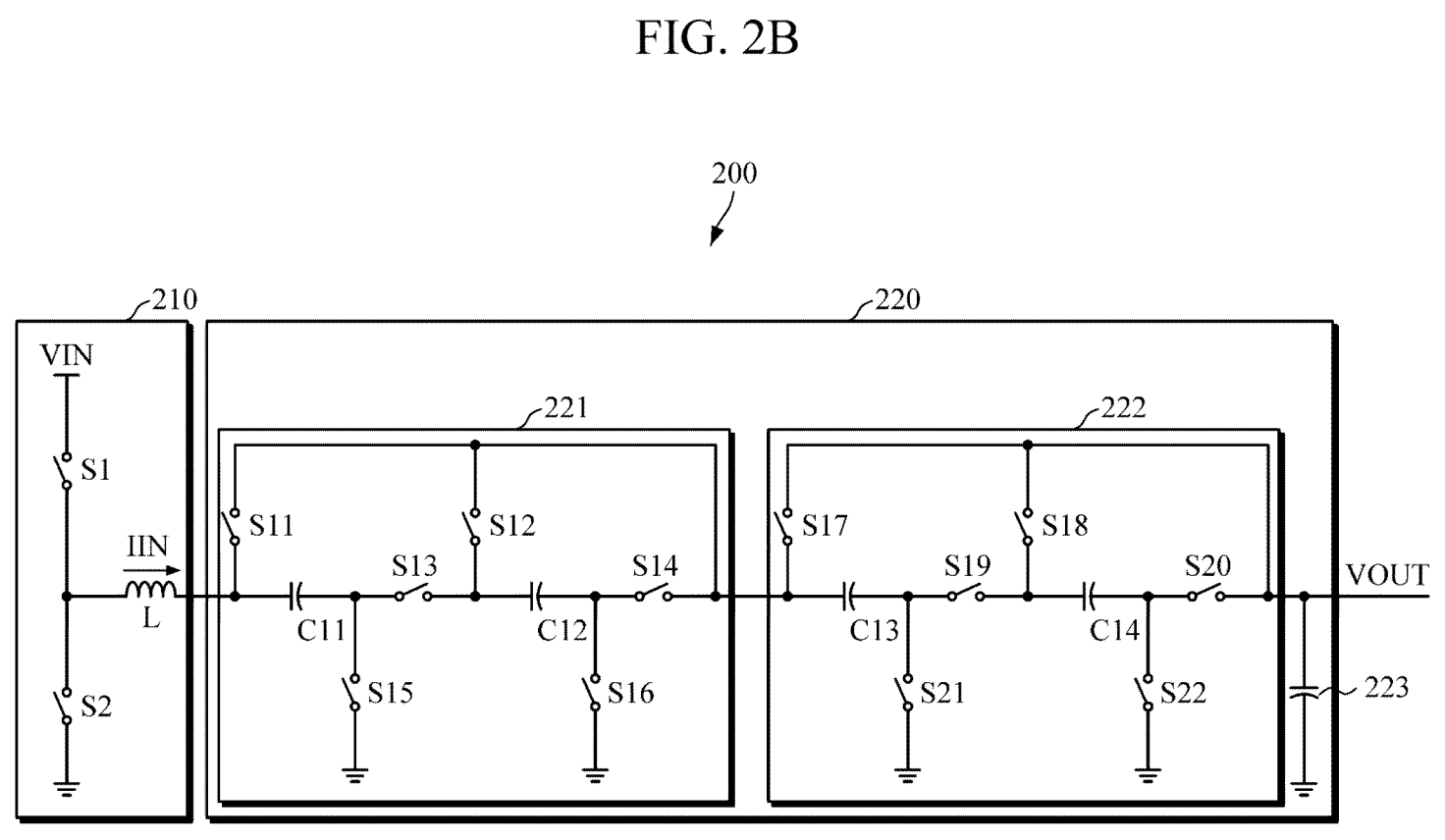

FIG. 2A is a block diagram illustrating a power converter according to an embodiment of the disclosure. FIG. 2B is a circuit diagram illustrating a power converter according to an embodiment of the disclosure.

Referring to FIGS. 2A and 2B, a power converter 200 includes a first circuit 210, a second circuit 220, and a controller 230. In this case, the first circuit 210 and the second circuit 220 may be connected in series with each other. According to an embodiment, the controller 230 may be referred to as a control circuit. According to another embodiment, the controller 230 may be a processor or a microcontroller.

The first circuit 210 may include a switched inductor circuit, and may output a current IIN by using a first voltage VIN as an input. For example, the first circuit 210 may receive the first voltage VIN as input and output the current IIN based on the first voltage VIN.

The switched inductor circuit may include, for example, a plurality of switches(S) and one or more inductors (L). According to an embodiment, the switched inductor circuit may be a circuit including only switches and inductors. For example, the switched inductor circuit may include two switches (S1 and S2) and one inductor (L1). According to an embodiment, the switches and inductors may be connected to each other through wiring or a conductive trace. According to an embodiment, the switches and inductors may be integrated into a single chip with the complementary metal-oxide semiconductor (CMOS) process. According to an embodiment, the switched inductor circuit may not include elements such as a capacitor, a transformer, or a resistor. However, the disclosure is not limited thereto, and as such, the switched inductor circuit may include other electronic elements and may have an arrangement different from the arrangement illustrated in FIG. 2B. The first circuit 210, including the switched inductor circuit, may serve as a power source of the power converter 200.

Figure 3A:
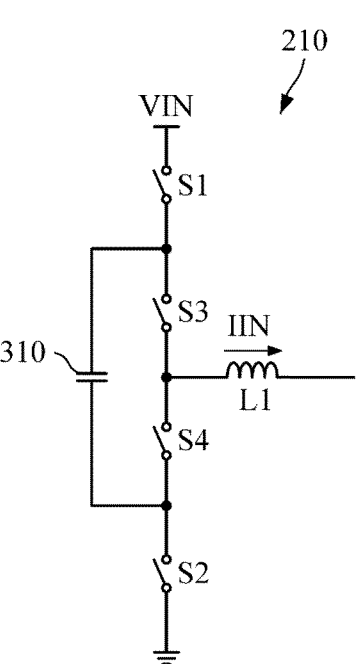
FIGS. 3A and 3B are circuit diagrams illustrating a first circuit according to another embodiment of the disclosure.
Figure 3B:
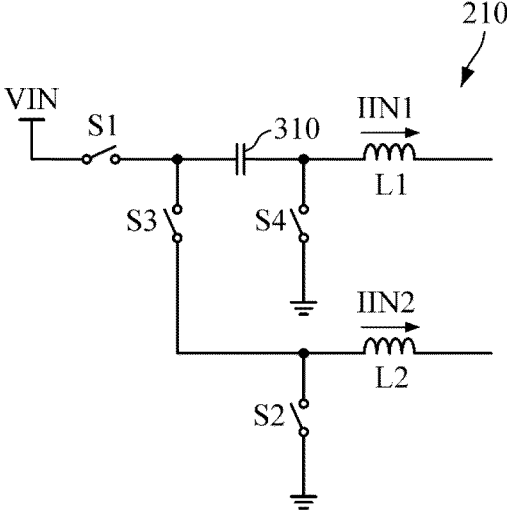

FIGS. 3A and 3B are circuit diagrams illustrating a first circuit according to another embodiment of the disclosure.

Referring to FIG. 3A, the first circuit 210 may be a circuit including four switches (S1, S2, S3 and S4), one flying capacitor (310), and one inductor (L1), with one output IIN. Referring to FIG. 3B, the first circuit 210 may be a circuit including four switches (S1, S2, S3 and S4), one flying capacitor (310), and two inductors (L1 and L2), with two outputs (IIN1 and IIN2). The first circuit 210 may include the flying capacitor 310 to increase the voltage. However, the disclosure is not limited thereto, and as such, according to another embodiment, the number of flying capacitors included in the first circuit 210 may be two or more.

In addition, the first circuit 210 may be configured as a circuit in which an output capacitor is excluded from a switched inductor DC-DC converter. According to an embodiment, the first circuit 210 may be configured as a circuit, for example, a buck converter, a double step down (DSD) converter, a three-level converter, etc., from which the output capacitor is excluded.

Referring to FIGS. 2A and 2B, the second circuit 220 may include a plurality of switched capacitor circuits and an output capacitor. For example, the second circuit 220 a first switched capacitor circuit 221, a second switched capacitor circuit 222 and an output capacitor 223. According to an embodiment, the second circuit 220 may output a second voltage VOUT, which is lower than the first voltage VIN, by using the current INN, output by the first circuit 210, as an input. For example, the second circuit 220 may receive the current INN from the first circuit 210 as an input, and output the second voltage VOUT based on the current INN.

According to an embodiment, the switched capacitor circuit may be a circuit including only switches and capacitors without using elements such as an inductor, a transformer, or a resistor. According to an embodiment, the switches and capacitors may be connected to each other through wiring or a conductive trace. According to an embodiment, the switched capacitor circuit may be integrated into a single chip with the complementary metal-oxide semiconductor (CMOS) process. However, the disclosure is not limited thereto, and as such, the switched capacitor circuit may include other electronic elements and may have an arrangement different from the arrangement illustrated in FIG. 2B.

According to an embodiment, the first switched capacitor circuit 221 may include six switches (S11, S12, S13, S14, S15 and S16) and two capacitors C11 and C12), and the second switched capacitor circuit 222 may include six switches (S17, S18, S19, S20, S21 and S22) and two capacitors C13 and C14). In this case, the switched capacitor circuit includes i number of capacitors and 3 times i number (3×i) switches, where i is a positive integer. However, the disclosure is not limited thereto, and as such, according to another embodiment, the number of capacitors and the number switches may different from the illustrated in FIG. 2B. Also, the ratio of the number capacitor to switches may be different than 1:3.

Figure 4A:
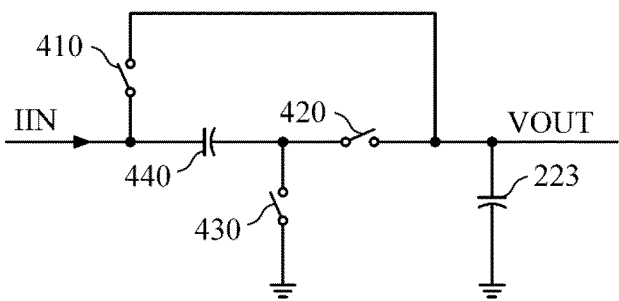
FIGS. 4A, 4B and 4C are circuit diagrams illustrating a switched capacitor circuit according to an embodiment of the disclosure.
Figure 4B:
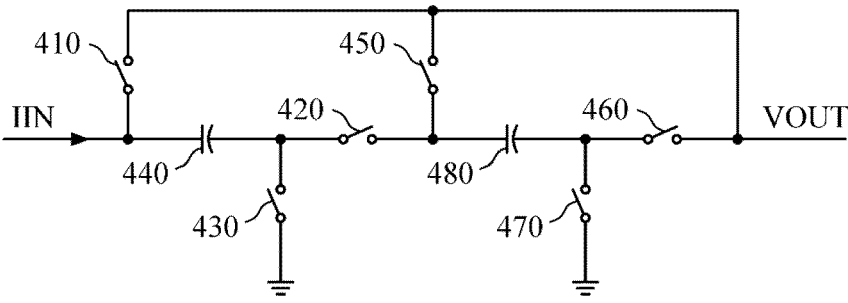
Figure 4C:
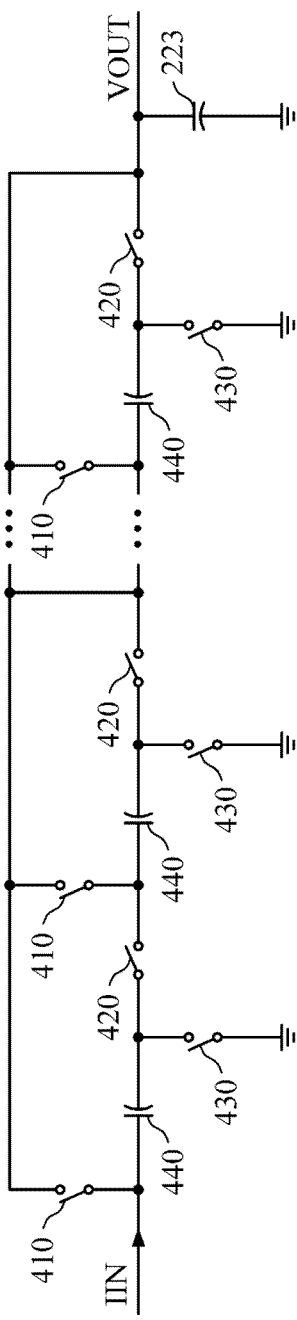

FIGS. 4A, 4B and 4C are circuit diagrams illustrating a switched capacitor circuit according to an embodiment of the disclosure.

Referring to FIG. 4A, for example, if i is 1, the switched capacitor circuit may include one capacitor (440) and three switches (410, 420 and 430). For example, the switched capacitor circuit may include a first switch 410 having one end connected to an input terminal, a second switch 420 having one end connected to another end of the first switch 410 and an output terminal, a third switch 430 connected to another end of the second switch 420 and grounded, and a capacitor 440 provided between the one end of the first switch 410 and the another end of the second switch 420.

According to another embodiment, in an example case in which i is 2, the switched capacitor unit may include two capacitors (440 and 480) and six switches (410, 420, 430, 450, 460, and 470) as illustrated in FIG. 4B. However, the disclosure is not limited thereto, and as such, according to another embodiment illustrated in FIG. 4C, the switched capacitor circuit may have a structure which is an extended form of the switch structure when i is 1, and is determined in consideration of the size and/or power efficiency of the power converter. However, the disclosure is not limited thereto, and as such, the structure and arrangement of the switched capacitor circuit may be based on other characteristics of the power converter.

The second circuit 220 is configured so that two or more switched capacitor circuits may be connected in series with each other. In the case in which two or more switched capacitor circuits are connected in series with each other, a duty of the second circuit 220 may increase compared to the case in which a single switched capacitor circuit is used, and as a result, power conversion efficiency may increase. In this case, two or more switched capacitor circuits may have the same structure, and at least some thereof may have different structures.

Referring to FIG. 2B, the second circuit 220 has a structure in which a first switched capacitor circuit 221, including two capacitors C11-C12 and six switches S11-S16, and a second switched capacitor circuit 222, including two capacitors C13-C14 and six switches S17-S22, are connected in series with each other. According to an embodiment, the first switched capacitor circuit 221 and the second switched capacitor circuit 222 may have the same structure.

Figure 5A:
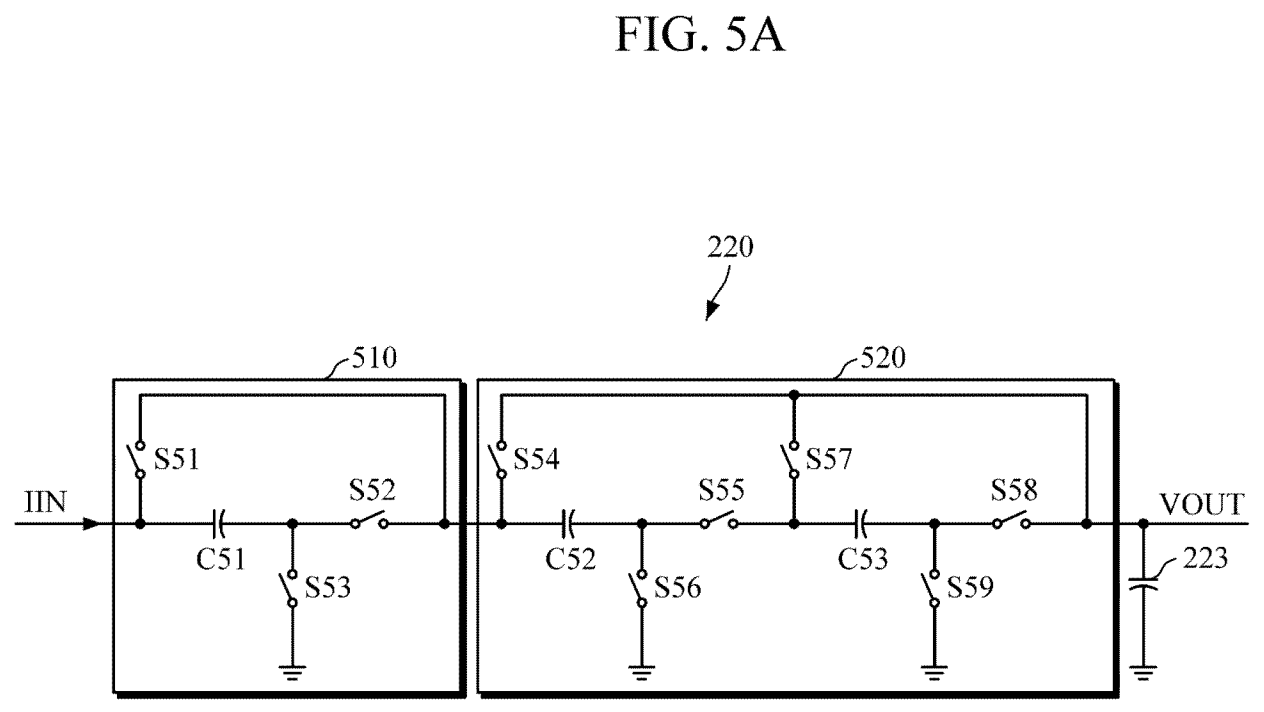
Figure 5B:
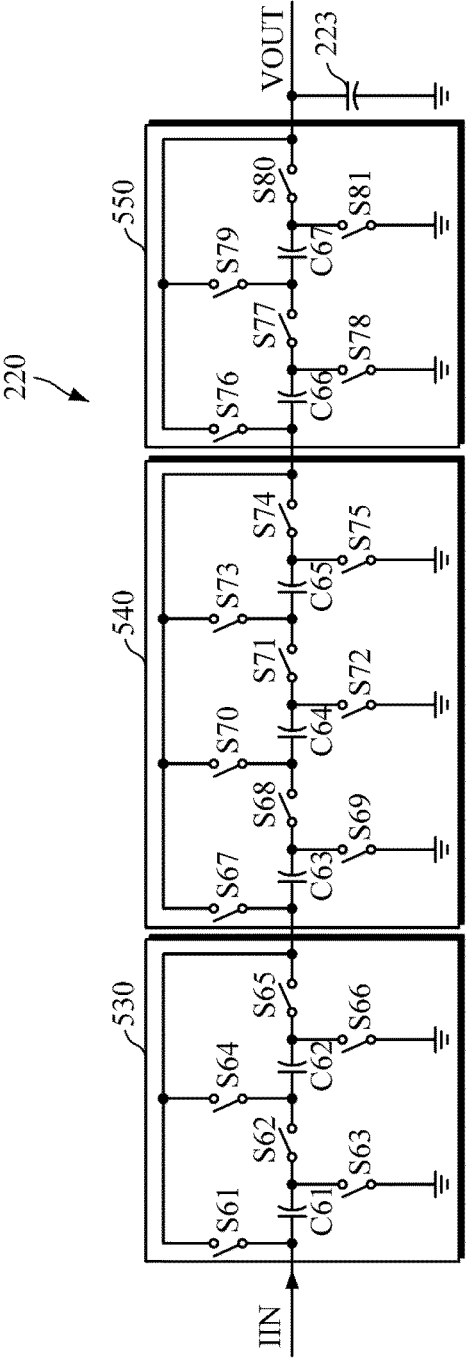

FIGS. 5A and 5B are circuit diagrams illustrating a structure of a second circuit according to another embodiment of the disclosure.

Referring to FIG. 5A, the second circuit 220 has a structure in which a switched capacitor circuit 510, including one capacitor (C51) and three switches (S51, S52 and S53), and a switched capacitor circuit 520, including two capacitors (C52 and C53) and six switches (S54, S55, S56, S57, S58 and S59), may be connected in series with each other. Further, referring to FIG. 5B, the second circuit 220 has a structure in which a switched capacitor circuit 530, including two capacitors (C61 and C62) and six switches (S61, S62, S63, S64, S65, and S66), a switched capacitor circuit 540, including three capacitors (C63, C64 and C65) and nine switches (S67, S68, S69, S70, S71, S72, S73, S74 and S75), and a switched capacitor circuit 550, including two capacitors (C66 and C67) and six switches (S76, S77, S78, S79, S80, and S81), are connected in series with each other. However, the structure of the second circuit 220 is not limited thereto. As such, according to another embodiment, the second circuit may include a different arrangement of capacitors and switches.

In this case, elements included in the second circuit 220 may be low-voltage elements compared to elements included in the first circuit 210. For example, switches and capacitors, which are the elements in the second circuit 220, may be used as low-voltage elements compared to the elements in the first circuit 210, thereby improving power density and switching frequency. For example, the second circuit 220 may include first elements configured to operate at a lower voltage than second elements including in the first circuit 210.

Referring to FIG. 2A, the controller 230 may control the second circuit 220. For example, the controller 230 may control the operation of the switches in the second circuit 220. In this case, the controller 230 may form a feedback loop with the second circuit 220.

According to an embodiment, in order to control the second voltage VOUT output by the second circuit 220, the controller 230 may form the feedback loop with the second circuit 220 to adjust a duty of the second circuit 220. According to an embodiment, an inductor of the first circuit 210 may not be included in the formed feedback loop, such that the power converter 200 may reduce conduction loss due to the inductor, thereby achieving a high frequency bandwidth and increasing power conversion efficiency.

According to an embodiment, a plurality of second circuits 220 may be connected in parallel with each other, and the controller 230 may drive the respective second circuits 220 with different phases.

Figure 6A:
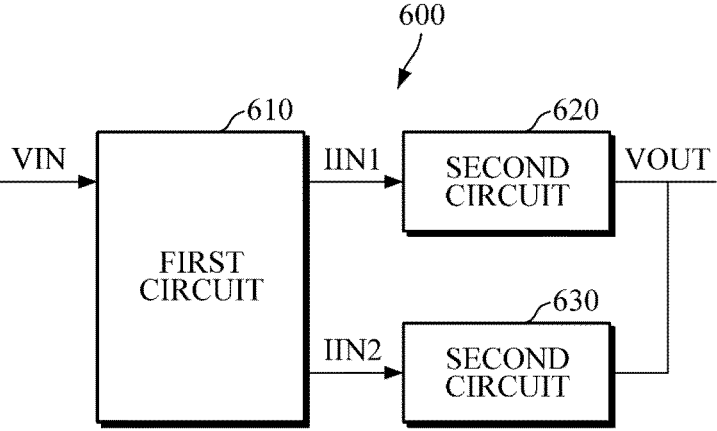
Figure 6B:
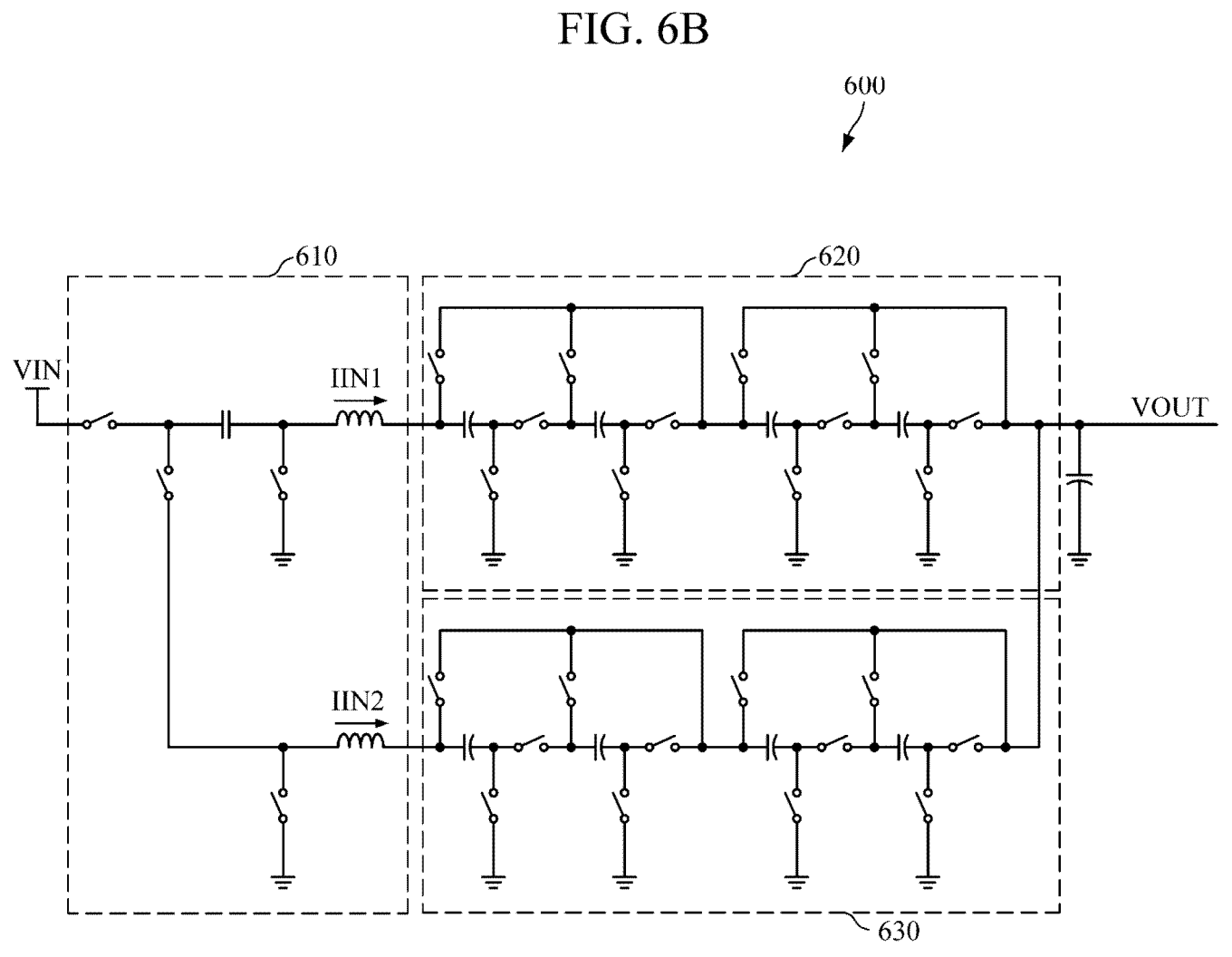
Figure 7A:
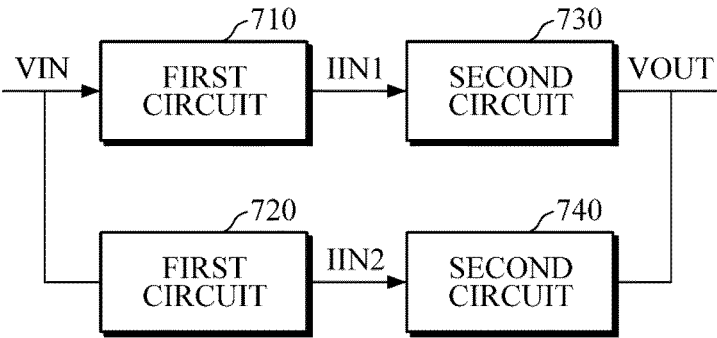
FIGS. 7A and 7B are a block diagram and a circuit diagram, respectively, of a power converter including a plurality of first circuits and a plurality of second circuits.

FIG. 6A is a block diagram of a power converter including a first circuit and a plurality of second circuits according to an embodiment, and FIG. 6B is a circuit diagram of a power converter including a first circuit and a plurality of second circuits according to an embodiment. FIG. 7A is a block diagram of a power converter including a plurality of first circuits and a plurality of second circuits according to an embodiment, and FIG. 7B is a circuit diagram of a power converter including a plurality of first circuits and a plurality of second circuits according to an embodiment.

Referring to FIGS. 6A and 6B, a power converter 600 includes a first circuit 610, and two currents IIN1 and IIN2 output by the first circuit 610 may be input to two second circuits 620 and 630, respectively, which are connected in parallel with each other, to output a second voltage VOUT. According to an embodiment, the first circuit 610 may be similar to the first circuit 210 illustrated in FIG. 3B, and the second circuits 620 and 630 may be similar to the second circuit 220 illustrated in FIG. 2B.

Figure 7B:
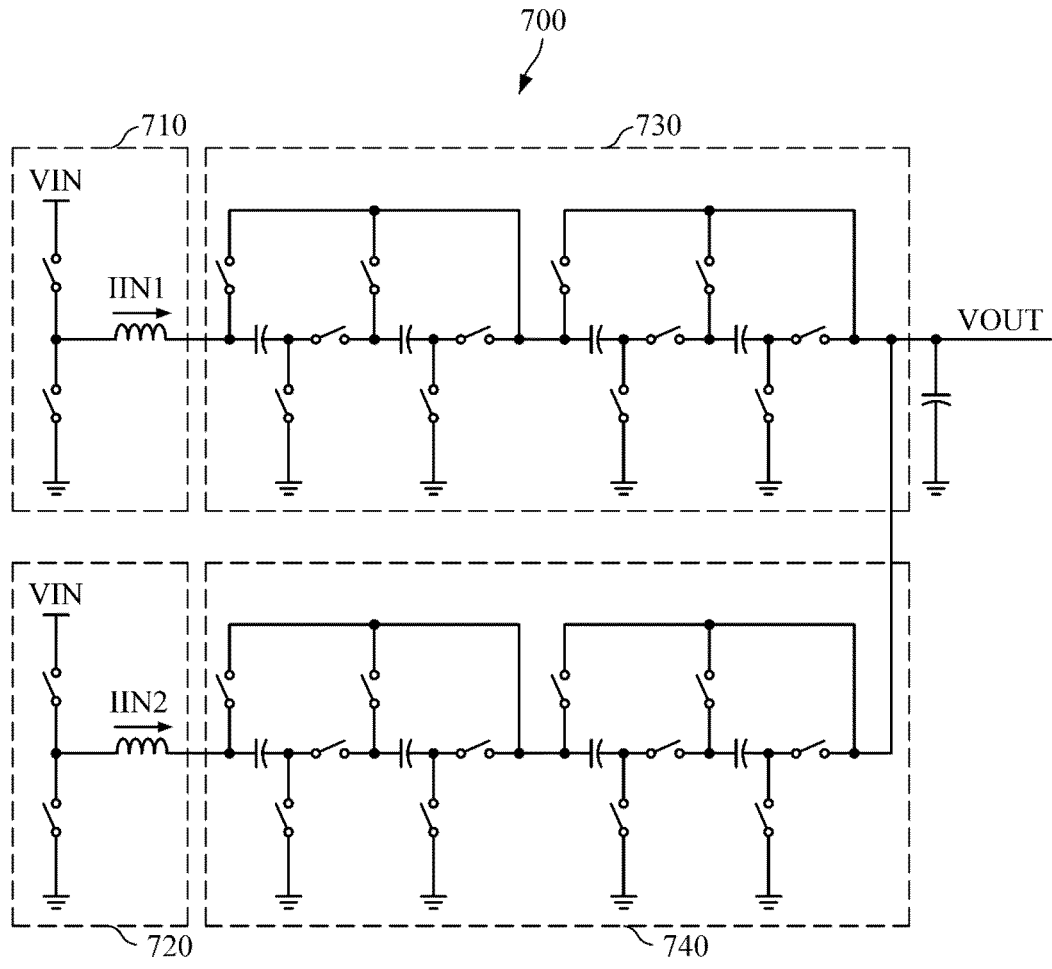

Referring to FIGS. 7A and 7B, a power converter 700 includes a first circuit 710 and a first circuit 720 which are connected in parallel with each other, and a first current IIN1 and a second current IIN2, which are respectively output by the first circuits 710 and 720, may be input to a second circuit 730 and a second circuit 740, respectively, which are connected in parallel with each other, to output a second voltage VOUT. According to an embodiment, the first circuits 710 and 720 may be similar to the first circuit 210 illustrated in FIG. 2B, and the second circuits 730 and 740 may be similar to the second circuit 220 illustrated in FIG. 2B.

According to an embodiment, in an example case in which the power converters 600 and 700 include the plurality of first circuits and second circuits and the power converters 600 and 700 drive the first and second circuits with the same phase difference, the plurality of elements may cause malfunction and power loss. In order to overcome this problem, the controller 230 may drive the plurality of second circuits, which are connected in parallel with each other, in a multi-phase manner with different phases.

The first circuit 210 may be driven in two stages, as in a buck converter. In this case, the first circuit 210 may be controlled by the controller 230, or may be controlled by another controller separate from the controller 230.

Figure 8A:
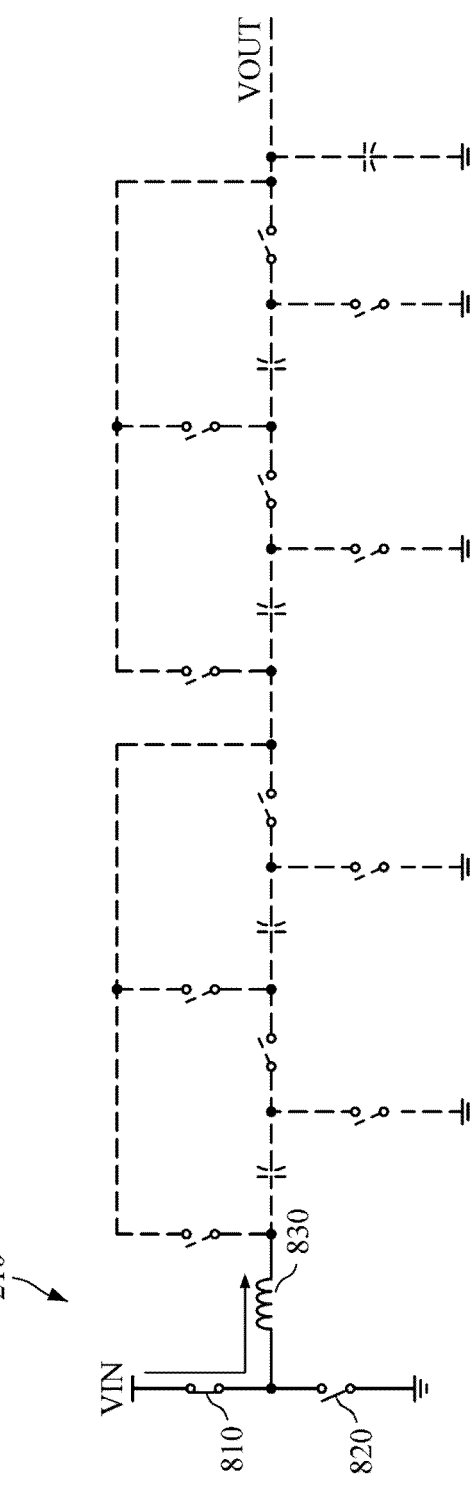
Figure 8B:
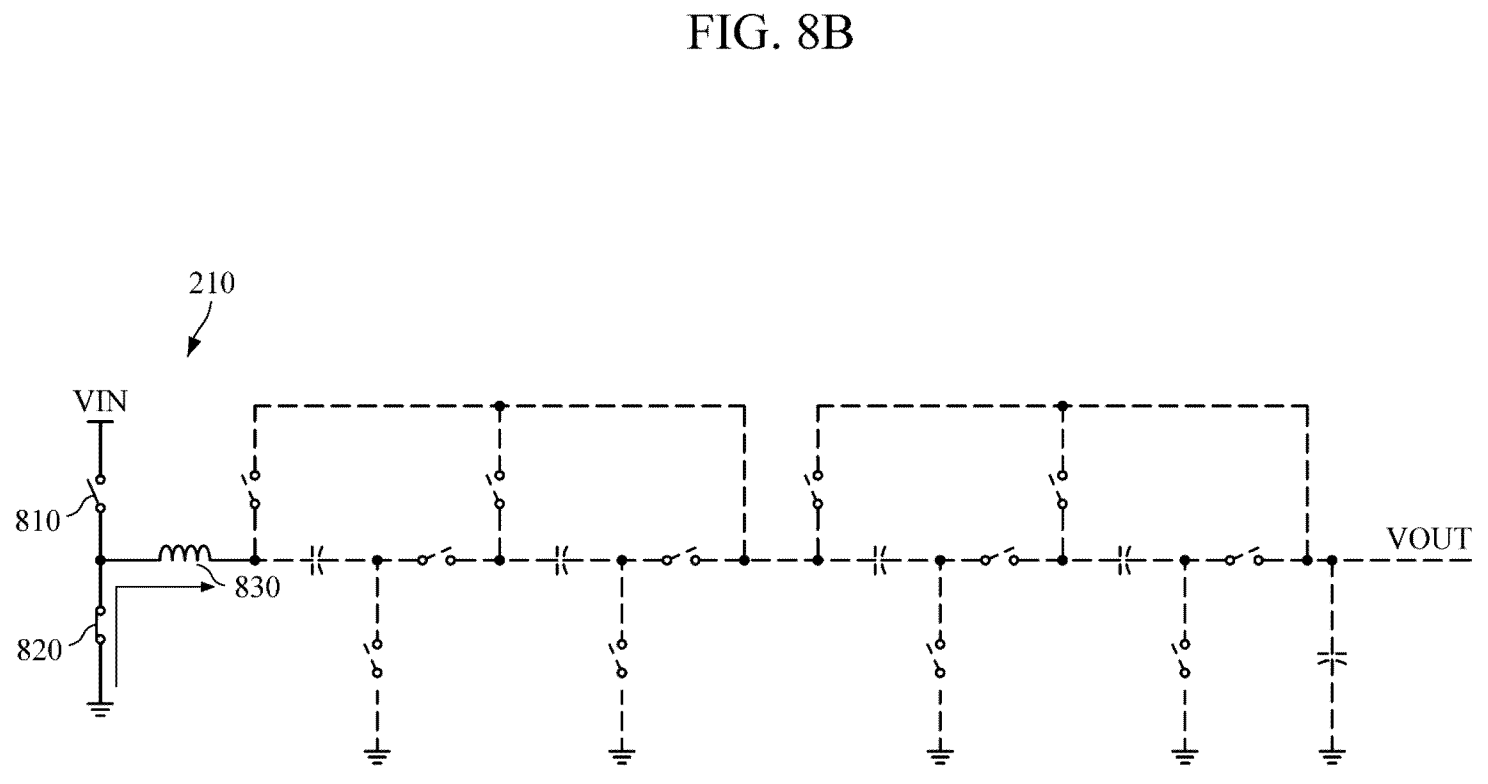

FIGS. 8A and 8B are circuit diagrams explaining an example of driving a first circuit. According to an embodiment, the first circuit 210 illustrated in FIGS. 8A and 8B may be same as the first circuit 210 illustrated in FIG. 2B.

Referring to FIG. 8A, in a first stage during a time period DLTL, a first switch 810 is closed and a second switch 820 is opened such that a current of an inductor 830 may be charged. Referring to FIG. 8B, in a second stage during a time period 1-DLTL, the first switch 810 is opened and the second switch 820 is closed such that the current of the inductor 830 may be discharged. Here, DL denotes the duty of the first circuit, and TL denotes the operating cycle of the first circuit.

The controller 230 may drive the second circuit 220 in two or more stages.

Figure 9A:
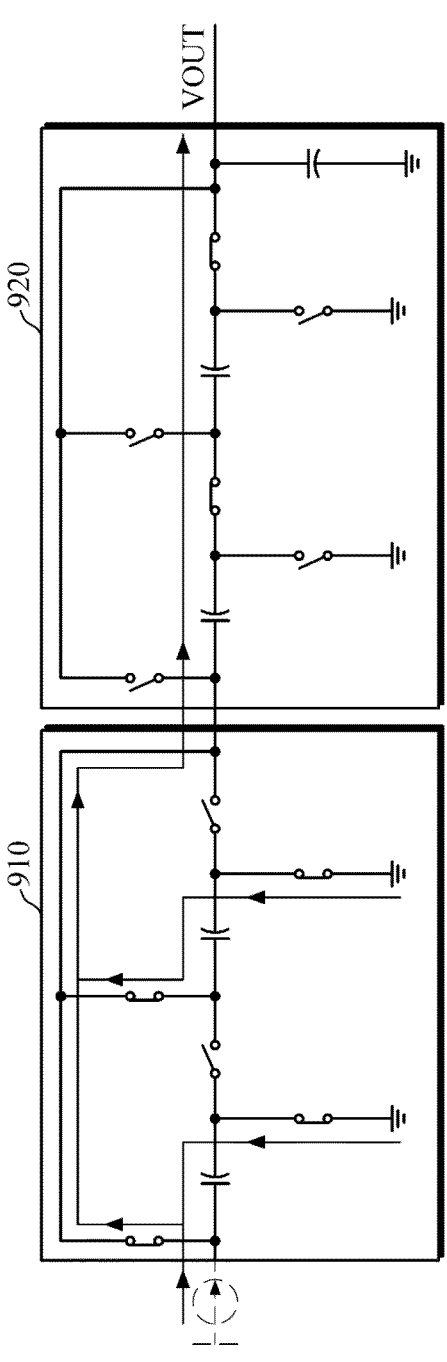
FIGS. 9A and 9B are circuit diagrams explaining an example of driving a second circuit.
Figure 9B:
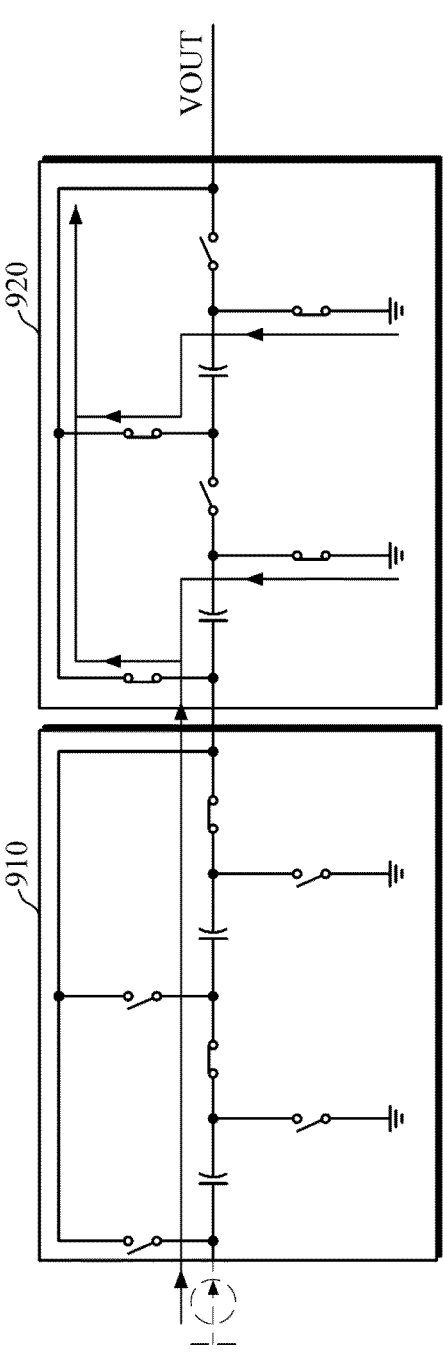

FIGS. 9A and 9B are circuit diagrams explaining an example of driving a second circuit. FIGS. 9A and 9B are circuit diagrams illustrating a structure in which two switched capacitor units are connected in series with each other, and the second circuit is driven in two stages. According to an embodiment, the switched capacitor circuits 910 and 920 illustrated in FIGS. 9A and 9B may be same as the switched capacitor circuits 221 and 222 illustrated in FIG. 2B.

Referring to FIG. 9A, in a first stage during a time period DcTc, capacitors in an odd-numbered switched capacitor circuit 910 may be charged and capacitors in an even-numbered switched capacitor circuit 920 may be discharged. Referring to FIG. 9B, in a second stage during a time period 1-DcTc, the capacitors in the odd-numbered switched capacitor circuit 910 may be discharged and the capacitors in the even-numbered switched capacitor circuit 920 may be charged. Here, Dc denotes the duty of the second circuit 220, and Tc denotes the operating cycle of the second circuit 220.

In this case, the duty DL set for the first circuit 210 and the duty Dc set for the second circuit 220 may be different from each other. For example, a fixed duty may be used for the first circuit 210. The first duty may be predetermined duty. As illustrated in FIG. 2A, by the formed feedback loop, the duty of the second circuit 220 may be adjusted under the control of the controller 230, such that the total power conversion ratio may be adjusted.

The power converter may set not only different duties for the first circuit 210 and the second circuit 220 but also different operating frequencies 1/TL and 1/Tc for the first circuit 210 and the second circuit 220, thereby controlling the first circuit 210 and the second circuit 220 independently of each other.

Generally, as a voltage conversion ratio of the converter (e.g., buck converter) increases, a duty cycle thereof is reduced, resulting in low power conversion efficiency. Further, even a converter using a two-stage power conversion structure also has problems of reduced power conversion efficiency and heat generation due to stepwise conversion, and a hybrid converter also has a drawback in that power density decreases due to the use of elements having high internal pressure.

According to the embodiment of the disclosure, a considerable amount of load current may be supplied by a capacitor with high energy density and small parasitic resistance compared to the inductor, thereby improving power efficiency of the power converter, and power density thereof may increase by minimizing the number of high-voltage elements at a front end of the inductor in the first circuit. Further, by reducing a voltage difference across the inductor, the duty cycle may be maximized under high power conversion ratio conditions. In addition, low-voltage elements are used in the second circuit compared to the first circuit, such that power density and swing frequency may be improved, and the first circuit and the second circuit may be controlled independently of each other, thereby simplifying circuit design and obtaining a wide conversion ratio. Furthermore, by adjusting the total conversion ratio by controlling only the duty of the second circuit while fixing the duty of the first circuit, i.e., by excluding the inductor of the first circuit from the feedback loop, a high frequency bandwidth may be achieved.

Figure 10:
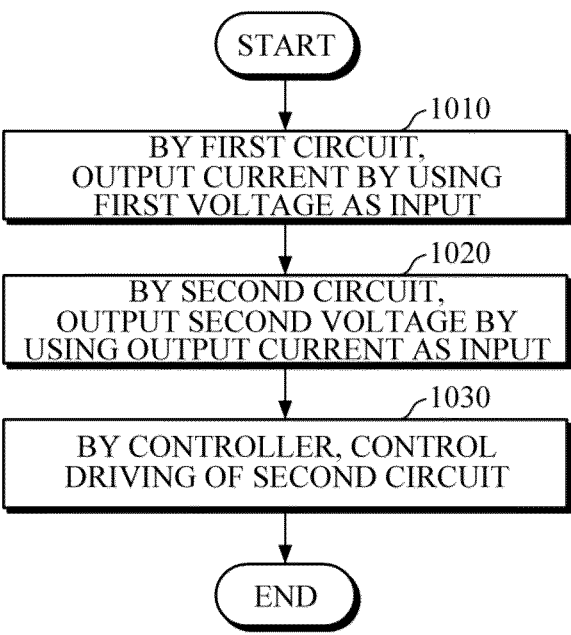
FIG. 10 is a flowchart illustrating a power conversion method according to an embodiment of the disclosure.
Figure 11:
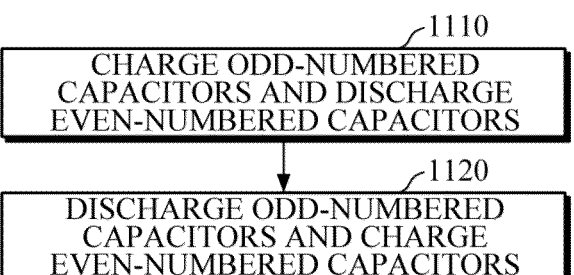
FIG. 11 is a flowchart illustrating an operation of controlling driving of a second circuit according to an embodiment of the disclosure.

FIG. 10 is a flowchart illustrating a power conversion method according to an embodiment of the disclosure. FIG. 11 is a flowchart illustrating an operation of controlling driving of a second circuit according to an embodiment of the disclosure. FIGS. 10 and 11 are diagrams illustrating an example of a power conversion method performed by the power converters of FIGS. 1A and 1B, which are described in detail above, and thus will be briefly described below in order to avoid redundancy.

Referring to FIG. 10, in operation 1010, the power converter may first output a current (e.g., IIN) by using a first voltage (e.g., VIN) as an input into a first circuit including a switched inductor circuit. According to an embodiment, the switched inductor circuit may be a circuit including only switches and inductors, and may include, for example, a plurality of switches and one or more inductors. However, the disclosure is not limited thereto, and as such, according to another embodiment, the first circuit may further include a flying capacitor along with switches and inductors.

In operation 1020, the power converter may output a second voltage (e.g. VOUT), by using the current output by the first circuit as an input into a second circuit including switched capacitor circuits and one output capacitor. The second voltage is lower than the first voltage. According to an embodiment, the switched capacitor circuit may be a circuit including only switches and capacitors without using elements such as an inductor, a transformer, or a resistor, and the switched capacitor circuit may include capacitors and switches. For example, the number of capacitors may be I, and the number of switches may be 3 times i (3×i), where i is an integer.

In this case, the second circuit is configured so that two or more switched capacitor circuits are connected in series with each other, and two or more switched capacitor circuits may have the same structure, or at least some thereof may have different structures.

In operation 1030, the power converter may control of the second circuit by a controller. In this case, by a feedback loop formed between the controller and the second circuit, the power converter may adjust the duty of the second circuit to control the second voltage. In this case, the inductor of the first circuit is not included in the formed feedback loop, such that the power converter may reduce conduction loss due to the inductor, thereby achieving a high frequency bandwidth and increasing power conversion efficiency. According to an embodiment, the first circuit, the second circuit and the controller may be similar to or same as the first circuit 210, the second circuit 220 and the controller 230, respectively in FIGS. 2A and 2B.

Referring to FIG. 11, in operation 1110, the method may include driving, among a plurality of switched capacitor circuits included in the second circuit, first charging capacitors in an odd-numbered switched capacitor circuit and discharging capacitors in an even-numbered switched capacitor circuit. In operation 1120, the method may include discharging the capacitors in the odd-numbered switched capacitor circuit and charging the capacitors in the even-numbered switched capacitor circuit. In this case, the power converter may operate a first stage during a period of time corresponding to a value obtained by multiplying the duty ratio and cycle of the second circuit, and may operate a second stage during a period of time corresponding to a value obtained by subtracting the value, obtained by multiplying the duty ratio and cycle of the second circuit, from 1.

The disclosure can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the invention can be readily inferred by programmers of ordinary skill in the art to which the invention pertains.

The disclosure has been described herein with regard to preferred embodiments. However, it will be obvious to those skilled in the art that various changes and modifications can be made without changing technical conception and essential features of the disclosure. Thus, it is clear that the above-described embodiments are illustrative in all aspects and are not intended to limit the disclosure.

What is claimed is:

1. A power converter comprising:
a first circuit comprising a switched inductor circuit, the first circuit configured to output a current based on a first voltage as an input of the first circuit;
a second circuit comprising a switched capacitor circuit and an output capacitor, the second circuit configured to output a second voltage lower than the first voltage, based on the current output by the first circuit as an input of the second circuit; and
a controller configured to control the second circuit to output the second voltage,
wherein the switched capacitor circuit comprises:
a first switch having a first end directly connected to an input terminal;
a second switch having a first end directly connected to a second end of the first switch and an output terminal;
a third switch having a first end directly connected to a second end of the second switch and a second end directly connected to ground; and
a capacitor provided between the first end of the first switch and the second end of the second switch.

2. The power converter of claim 1, wherein the first circuit comprises a plurality of switches and one or more inductors.

3. The power converter of claim 2, wherein the first circuit further comprises a flying capacitor.

4. The power converter of claim 1, wherein the switched capacitor circuit comprises i number of capacitors and 3 times i (3×i) number switches, where i is a positive integer.

5. The power converter of claim 1, wherein the second circuit comprises two or more switched capacitor circuits connected in series with each other.

6. The power converter of claim 5, wherein the two or more switched capacitor circuits have a same structure.

7. The power converter of claim 5, wherein at least some of the two or more switched capacitor circuits have different structures.

8. The power converter of claim 7, wherein the second circuit comprises:

a first switched capacitor circuit having one capacitor and three switches, and a second switched capacitor circuit having two capacitors and six switches, wherein the first switched capacitor circuit and the second switched capacitor circuit are connected in series with each other.

9. The power converter of claim 7, wherein the second circuit comprises:

a first switched capacitor circuit having two capacitors and six switches, a second switched capacitor circuit having three capacitors and nine switches, and a third switched capacitor circuit having two capacitors and six switches, wherein the first switched capacitor circuit, the second switched capacitor circuit and the third switched capacitor circuit are connected in series with each other.

10. The power converter of claim 1, wherein the second circuit comprises first elements configured to operate at a lower voltage than second elements of the first circuit.

11. The power converter of claim 1, wherein a first duty is set for the first circuit, and a second duty is set for the second circuit, wherein the first duty is a fixed value.

12. The power converter of claim 11, wherein the controller is configured to form a feedback loop with the second circuit to adjust the second duty of the second circuit.

13. The power converter of claim 1, further comprising another second circuit connected in parallel with the second circuit, wherein the controller is configured to drive the second circuit and the other second circuit with different phases.

14. The power converter of claim 1, wherein the controller is configured to drive the second circuit in two or more stages.

15. The power converter of claim 14, wherein the second circuit further comprises a first group of switched capacitor circuits and a second group of switched capacitor circuits, and wherein the controller is configured to:

control the second circuit, in a first stage to charge capacitors in the first group of switched capacitor circuits and discharge capacitors in the second group of switched capacitor circuits, and control the second circuit, in a second stage, to charge the capacitors in the first group of switched capacitor circuits and discharge the capacitors in the second group of switched capacitor circuits.

16. The power converter of claim 15, wherein the controller is configured to operate the first stage during a period of time corresponding to a value obtained by multiplying a duty ratio and cycle of the second circuit, and to operate the second stage during a period time corresponding to a value obtained by subtracting the value, obtained by multiplying the duty ratio and cycle of the second circuit, from 1.

17. The power converter of claim 1, wherein the switched capacitor circuit comprises i number of capacitors and exactly 3 times i (3×i) number switches, where i is a positive integer.

18. A power conversion method comprising:

outputting a current by using a first voltage as an input into a first circuit including a switched inductor circuit;

outputting a second voltage by using the current output by the first circuit as an input into a second circuit including a switched capacitor circuit and an output capacitor, the second voltage being lower than the first voltage, the switched capacitor including a first switch having a first end directly connected to an input terminal, a second switch having a first end directly connected to a second end of the first switch and an output terminal, a third switch having a first end directly connected to a second end of the second switch and a second end directly connected to ground, and a capacitor provided between the first end of the first switch and the second end of the second switch; and controlling, by a controller, an operation of the second circuit.

19. The power conversion method of claim 18, wherein the controlling of the operation of the second circuit comprises:

forming a feedback loop between the controller and the second circuit; and adjusting a duty of the second circuit to control the second voltage.

20. The power conversion method of claim 18, wherein the controlling of the operation of the second circuit comprises:

charging capacitors in a first group of switched capacitor circuits including in the second circuit and discharging capacitors in a second group of switched capacitor circuits included in the second circuit; and discharging the capacitors in the first group of switched capacitor circuits and charging the capacitors in the second group of switched capacitor circuits.

* * * * *